United States Patent [19]
Boesel

[11] 3,761,754
[45] Sept. 25, 1973

[54] DYNAMOELECTRIC MACHINE FIELD STRUCTURE AND METHOD FOR FORMING

[75] Inventor: Walter F. Boesel, Palos Verdes Estates, Calif.

[73] Assignee: The Garrett Corporation, Los Angeles, Calif.

[22] Filed: Apr. 23, 1972

[21] Appl. No.: 237,576

Related U.S. Application Data

[63] Continuation of Ser. No. 103,407, Jan. 4, 1971, abandoned.

[52] U.S. Cl. .................................. 310/218, 310/269
[51] Int. Cl. .............................................. H02k 1/16
[58] Field of Search................. 310/42, 186, 63, 310/211, 218, 262, 254, 259, 269, 187, 191, 194, 40, 51, 214, 216, 218

[56] References Cited
UNITED STATES PATENTS

| | | | |
|---|---|---|---|
| 2,745,031 | 5/1956 | Rimkus | 310/217 |
| 3,502,923 | 3/1970 | Howell | 310/187 |
| 2,766,392 | 10/1956 | Wagner | 310/259 |
| 3,243,688 | 3/1966 | Brundage | 310/258 |
| 2,723,359 | 11/1955 | Feiertag | 310/42 |

Primary Examiner—R. Skudy
Attorney—Orville R. Seidner et al.

[57] ABSTRACT

A salient pole for a dynamoelectric machine has a pole tip element with a smooth pole face at the air gap and an oppositely disposed attachment face arranged to register at an interface with the mating attachment face of a pole body comprising part of a yoke. Slots to accommodate a compensating winding extend from one or both of the attachment faces of the respective pole elements, the slot in the tip element extending into the pole tip toward the smooth face. The mating faces may be secured together by coating one or both of the faces with a bonding agent and thereafter applying a magnetizing force to draw the tip and body parts together while curing of the bond is proceeding.

17 Claims, 5 Drawing Figures

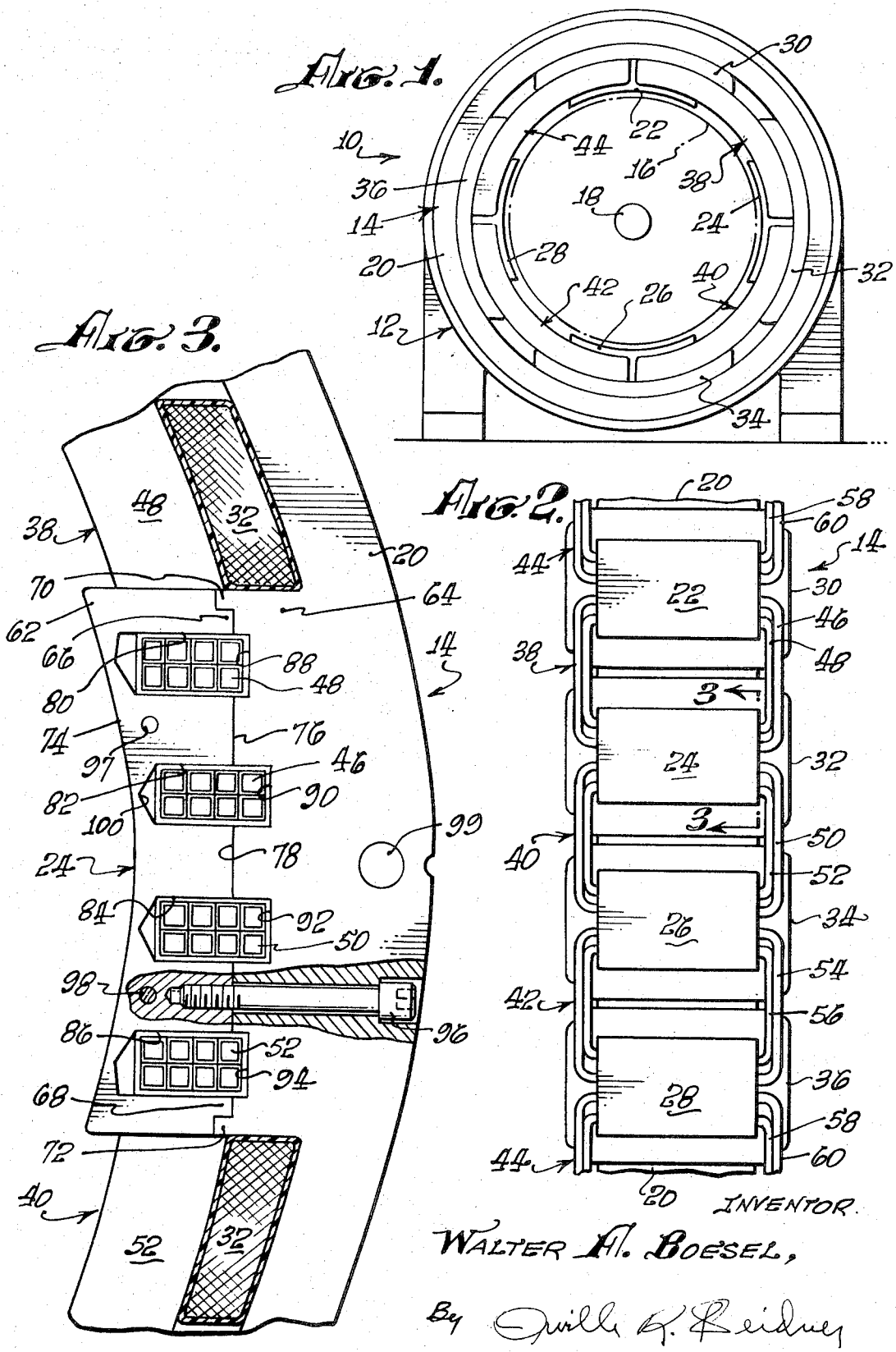

INVENTOR.
WALTER H. BOESEL,
By Orville R. Seidner
AGENT

DYNAMOELECTRIC MACHINE FIELD STRUCTURE AND METHOD FOR FORMING

This is a continuation of application Ser. No. 103,407, filed Jan. 4, 1971, and now abandoned.

BACKGROUND OF THE INVENTION

In dynamoelectric machines having a commutating armature there is always present the problem of the cross-magnetizing field in the armature created by the load current therein. The problem is of little consequence in the smaller machines; but when the machine size becomes greater than a few horsepower, and maximum overload and broadest speed range are desirable, it is then necessary to provide the machine with compensating windings coupled in series with the armature to carry the running current. This operates to neutralize the cross-magnetization to the extent possible.

In the prior art it has been customary to form the salient poles of the machines with slots in the pole faces to accommodate the compensating windings. In order to provide optimum performance, it has been found that partly closed or totally closed slots with a saturable section are required. This is because open slots result in high ripple voltage, magnetic noise and vibration; hence this machine structure is used only in small machines with many turns per slot. In particular cases where noise and vibration level may be of concern, it is essential that the closed slot configuration be utilized, such as in the case of motors required for vehicle propulsion. Additionally, the closed slot construction results in higher load capacity.

However, despite the advantages of the closed slot construction, there are fabrication difficulties which result in high labor costs in placing the windings in the slots. Heretofore the only way to insert windings in closed slots was to utilize rigid insulated bars inserted axially into the slots, after which the ends of the bars were coupled with connectors to form the desired windings. It is apparent, of course, that it is next to impossible to thread small stranded conductors into the slots in this fashion since this would be kindred to attempting to push a rope from the end.

SUMMARY OF THE INVENTION

The structure disclosed here is characterized by a pole tip having a smooth face at the air gap. The pole tip is a separable entity from the yoke which may have a pole body extending radially inwardly from the yoke and arranged to have the pole tip secured thereto. Thus the pole tip has a smooth face at the air gap and an oppositely disposed face configured to mate in registry with a mating face on the body. The pole tip is formed with regularly configured voids, preferably being slots depending into the tip from the oppositely disposed face toward the air gap face. The slots are arranged to envelop the pre-wound and pre-formed compensating winding coils.

When the pole tip is to be placed in position in the body, the mating face of one or both may be coated with a curable bonding agent, and with the pole tip in position a magnetizing force may be applied to the pole during the curing cycle to draw the tip into intimate contact with the body until the cure is complete. Thus the magnetic reluctance at the interface is reduced to a minimum.

BRIEF DESCRIPTION OF THE DRAWINGS

FIG. 1 is an end elevation view of a dynamoelectric machine with one end bell removed to show the stator field structure, the armature being shown schematically;

FIG. 2 is a plan view of the field structure of FIG. 1, developed from a view looking radially from the axis of rotation of the armature;

FIG. 3 is an enlarged fragmentary elevation view of a portion of the field structure, taken on the line 3—3 of FIG. 2;

DESCRIPTION OF THE PREFERRED EMBODIMENTS

Figure 4:
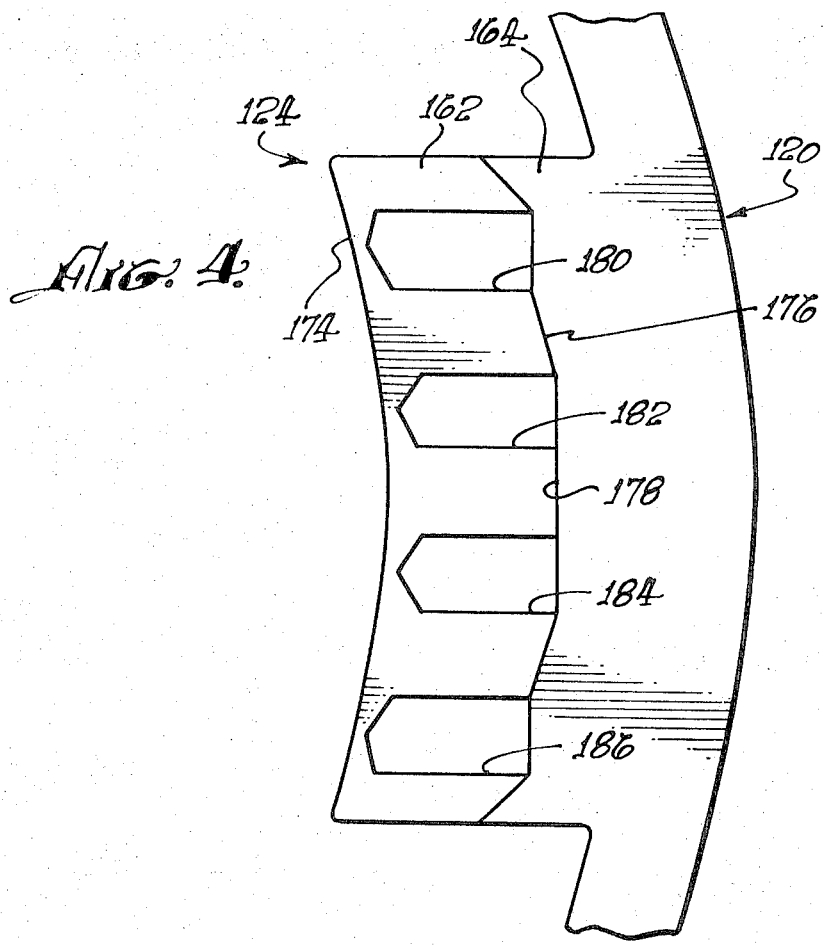
FIG. 4 is a view similar to FIG. 3, showing an alternate embodiment.

Referring to FIG. 1 there is depicted a dynamoelectric machine 10 having a frame 12 adapted to receiving a pair of end bells (not shown). The machine 10 comprises a stator field structure 14 disposed within the frame 12 and a rotor armature structure 16 disposed about a shaft 18, which is arranged to be journaled in the end bells. The rotor 16 is depicted merely in schematic form in order that the invention may be presented in greater clarity.

The stator 14 comprises a yoke 20 establishing a path for magnetic flux between the salient poles 22, 24, 26 and 28. It will be appreciated although a four-pole machine is illustrated, the invention could be practiced with machines of two poles, six poles, or any desired number. Disposed over each of the poles 22, 24, 26 and 28 adjacent to the yoke 20 are the respective excitation windings 30, 32, 34 and 36 which may be of either the self excitation or of the separate excitation type, as required for the purpose.

Superimposed over the excitation windings are the compensation windings 38, 40, 42 and 44 which link the salient poles in known fashion. That is, the winding 38 links the poles 22 and 24, the winding 40 links poles 24 and 26, the winding 42 links poles 26 and 28, and the winding 44 links the poles 28 and 22, all as best seen in FIG. 2.

It will be appreciated, of course, that the excitation windings 30, 32, 34 and 36 are arranged to be coupled to each other and to a source of excitation current by conductors (not shown). In like fashion, the compensation windings 38, 40, 42 and 44 may be arranged to carry the current in the armature 16 by being coupled thereto and to each other by conductors (not shown).

As seen in FIG. 2, the compensation windings each comprise two coils, although it will be understood by those skilled in the art that any number of coils may be employed. As shown, the winding 38 comprises an outer coil 46 and an inner coil 48. In like fashion, the windings 40, 42 and 44 are comprised of outer and inner respective coils 50 and 52, 54 and 56, and 58 and 60. It will be observed that whereas the excitation windings envelop the salient poles, the coils of the compensating windings enter and exit the poles. The structure and relationship of the windings and poles will be best understood by reference to FIG. 3 which illustrates the novel salient pole structure provided for the machine.

In FIG. 3 the pole 24 is shown as comprising a pole tip 62, and a pole base structure which includes a lower body 64 and a yoke 20. The body 64 which extends radially inwardly from the yoke 20 of the field structure 14. Preferably, the body 64 extends radially inwardly a sufficient distance so as to constitute a positioning means for the excitation winding 32 which envelopes the pole. Stepped portions 66 and 68 on the pole tip 62 are provided for mating registry with respective stepped portions 70 and 72 on the body 64 to assure accurate positioning of the pole parts. It is seen that the pole tip 24 has a smooth pole face 74 arranged to define an air gap with the adjacent armature 16, and has an opposing back face 76 arranged faying a mating face 78 of the body 64.

A plurality of parallel-sided slots 80, 82, 84 and 86 depend from the face 76 into the pole tip 62 to accommodate therein the respective winding coils 48, 46, 50 and 52. Each of the slots 80, 82, 84 and 86 terminates short of the pole face 74 to define a closed side. The pole body 64 is provided with parallel-sided slots 88, 90, 92 and 94 in registry with the respective slots 80, 82, 84 and 86 on the pole tip 62. The slots 88, 90, 92, and 94 terminate within the pole base to define closed sides opposite those defined by the slots 80, 82, 84, and 86. The slot arrangements formed on the pole tip and pole body intersect the faces 76 and 78. It will be observed that the slots in the body 64 are considerably shallower than those in the tip 62. Essentially, the slots in the body 64 are desirable merely for those cases where it is preferable to pre-place the compensating windings 46, 48, 50 and 52 in accurate position on the yoke 20 before assembling the tip 62 on the body 64. It is apparent, of course, that the excitation winding 32 is placed in position enveloping the body 64 before the compensating windings are placed in the body slots.

A bolt 96 disposed in a counterbored hole in the yoke 20, is one of a plurality of such bolts that are threadably received in the pole tip 62 so as to secure the latter in position on the body 64 with the winding 32 in place and the windings 46, 48, 50 and 52 enclosed within the pole slots and extending through the open ends of the slots. It will be obvious to those skilled in the art that any number of bolts corresponding to the bolt 88 may be employed as dictated by design consideration, taking into account the length of the pole in an axial direction and the width of the pole at the interface of the tip and body.

As a matter of preference, the entire magnetic field structure is comprised of a plurality of laminations in accordance with known practice. To this end the tip 62 is formed into a unitary magnetic structure with its laminations secured by rivets 97 and 98, for example. In like fashion the yoke 20 and its pole body extension 64 may have its laminations secured by a plurality of rivets, one of which is depicted at 99.

It will be observed that the bottoms of the slots 80, 82, 84 and 86 converge from the parallel sides to reduced sections of the tip 62. For example, the slot 82 converges from its parallel side walls to the line 100 which defines with the tip face 74 a magnetic flux saturable section of the tip 62 relative to the winding 50. This is known practice to achieve a smooth pole face and at the same time assure that a major portion of the flux generated by the winding 50 traverses the air gap and the iron of the armature 16 to achieve the compensating effect of the winding 50. Only a very minor portion of the flux is short circuited, so to speak, through the tip section between the pole face 74 and the slot line 90. The slot spaces between the bottoms of the slots and windings may be filled with any preferred non-magnetic slot filler to insure that the windings are secured in the slots against vibration or movement.

The pole structure as described above depicts a structure having slots in the pole body to accommodate at least a small portion of the compensating windings. In those cases when there is no preference or necessity for slots in the body to pre-place the compensating windings, a somewhat simpler pole configuration may be employed, such as that illustrated on FIG. 4.

FIG. 4 depicts fragmentarily a yoke 120 of a dynamoelectric machine comprising a salient pole 124 which is formed of a pole tip 162 and pole body 164. The tip 162 has a smooth pole face 174 which defines the air gap between the salient pole 124 and the adjacent armature (not shown). The tip 162 is also provided with an attaching back face 176 oppositely disposed from the front pole body face 174. The back face 176 is configured to mate with the attachment face 178 on the pole body 164.

Extending from the back face 176 toward the front face 174 are a plurality of winding slots 180, 182, 184 and 186 which intersect the faces 176 and 178 and are shown here as four in number similar to the arrangement of FIG. 3. These slots have a depth from top to bottom which is calculated to be sufficient to receive the compensating windings (not shown), and since the front face 174 is arcuate, it is obvious that the projection of the tops of slots 180 and 186 will differ from the projection of the tops of slots 182 and 184. Thus the tops of all the slots will not lie in a single plane and the attachment faces 174 and 176 are configured as shown. Such an arrangement preserves the greatest amount of magnetic material for the magnetic flux. It is obvious, of course, that the interface configuration can be whatever the machine designer desires or needs, and is not limited to the particular configuration illustrated in FIG. 4.

As will be observed, the slots 180, 182, 184 and 186 are parallel-sided with the bottoms of the slots adjacent the pole face 174 converging from the parallel sides to lines adjacent the surface of face 174, thereby defining a closed side for each slot. The lines thus define with the face 174 saturable sections of the tip in accordance with design principles, such as set forth briefly above in connection with FIG. 3.

It has been mentioned hereinabove that the attaching surfaces of the pole tips and/or the attachment surfaces of the pole bodies may be coated with a curable bonding agent to secure the tips in position. Also, in connection with FIG. 3 the securing of the tips by means of bolts is shown and described. A further novel step may now be employed in connection with the curing or setting of the bonding cement. either with or without bolts such as mentioned in connection with the embodiment of FIG. 3. This step is the employment of magnetism to draw the pole tips into the most intimate interfacing relationship with the pole bodies, by introducing magnetism through the pole tips and bodies along the axes of the poles.

This is most easily and advantageously done by energizing the excitation windings of the dynamoelectric machine. Preferably a magnetic tool or tools are employed to complete the flux path between the poles.

Figure 5:
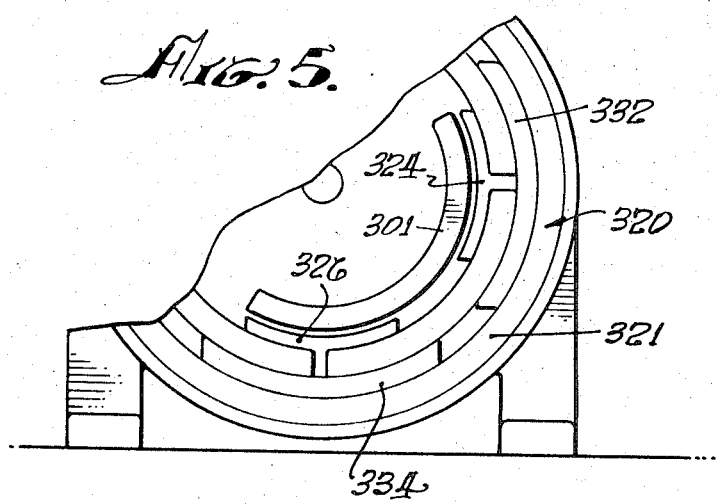
FIG. 5 is a fragmentary end elevation view of the frame and field structure, similar to FIG. 1 and showing one form of a tool utilized in the assembly method.

In FIG. 5, for example, there is shown a magnetic tool 301 disposed on the faces of the poles 324 and 326. After the pole tip or body surfaces have been coated as aforesaid and the tips positioned in place with all excitation windings and compensating windings properly assembled and positioned, the magnetic tool 301 is positioned over the faces of the poles 324 and 326 as shown in FIG. 5. Simultaneously, or perhaps immediately preceding, the bolts such as the bolt 96 of FIG. 3, are screwed tight, after which the excitation field windings are energized. Upon the energization of one or both of the respective excitation windings 332 and 334 there is established a magnetic flux through the tool 301, the poles 324 and 326 and the intermediate portion 321 of the yoke 320. The magnetic field established is substantially uniform across the interfaces of the pole tips and bodies and this fact tends to draw all portions of the pole tip attaching faces into the most intimate near contact with the attachment faces of the pole bodies, extruding the excess and unnecessary bonding cement from the interfaces in the process.

Preferably, the magnetic field is maintained until the bonding cure is complete or the cement otherwise sets. In this fashion the magnetic field tends to draw the parts ever closer together against the resistance offered by the viscous bonding agent.

I claim:

1. A magnetic pole tip in combination with a dynamoelectric machine having current windings and rotor and stator members establishing a magnetic flux path through an air gap between said members,
   said tip provided with a pole face for defining said air gap and an oppositely disposed attachment face configured to register with a mating attachment face on one of said members whereby said tip is arranged for connection to said one of said members with said attachment faces in faying relationship,
   said pole tip and said one member being cooperatively arranged, when said attachment faces are in faying relationship, to define at least one winding slot means open at the ends thereof and closed at the sides thereof and intersecting said attachment faces.

2. The magnetic pole tip of claim 1 in which said slot means includes a slot extending into said pole tip from said tip attachment face and terminating short of said pole face.

3. The tip of claim 1 in which said slot means includes parallel side surfaces.

4. The tip of claim 3 in which said slot means includes a slot extending into said tip with said side surfaces parallel to the centerline of said tip.

5. The tip of claim 4 in which said slot extends from one end of said tip to the other in a direction parallel to the axis of said rotor member.

6. The tip of claim 4 in which said one of said members is the stator member of said machine.

7. A salient pole for a dynamoelectric machine, said salient pole having electrical winding means extending therethrough, said salient pole comprising:
   a pole tip having a first attachment face;
   a pole base having a second attachment face; and
   means for securing said pole tip to said pole base for disposing said attachment faces in faying relationship;
   said attachment faces being configured to mate in registry when in faying relationship;
   said pole tip and said pole base being cooperatively arranged, when said attachment faces are in faying relationship, to define at least one winding slot means open at the ends thereof and closed at the sides thereof and intersecting said attachment faces.

8. The salient pole of claim 7 wherein said pole tip includes a smooth pole face surface oppositely disposed to said first attachment face.

9. The salient pole of claim 7 in which said tip base comprises a tip body connected to the yoke of said machine.

10. The salient pole of claim 7 wherein said slot means comprises a slot extending into one of said pole tip and said pole base from the attachment face thereof and terminating therein to define a closed side; the attachment face of the other of said pole tip and said pole base extending across and closing the opposite side of said slot.

11. The salient pole of claim 10 wherein said one of said pole tip and said pole base comprises said pole tip.

12. The salient pole of claim 7 wherein said slot means comprises a first slot extending into said pole tip from the first attachment face, and a second slot extending into said pole base from the second attachment face, said first and second slots being in registry.

13. In a dynamoelectric machine of the type having a stator member with coil windings extablishing magnetic flux and a rotor member mounted for rotation about an axis relative to said stator member, the improvement comprising a pole body and a pole tip on said stator member, said pole body and pole tip having opposed attachment faces and said pole tip having a pole face adjacent said rotor member and spaced from the attachment face of said pole tip, means for securing said pole tip to said pole body for disposing said attachment faces in faying relationship, said attachment faces being configured to mate in registry when in faying relationship; said pole tip and said pole body being cooperatively arranged, when said attachment faces are in faying relationship, to define a plurality of winding slot means open at the ends thereof and closed at the sides thereof and intersecting said attachment faces; said slot means including a plurality of slots extending into said pole tip and terminating short of said pole face.

14. A dynamoelectric machine according to claim 13 wherein said slot means further includes a plurality of slots extending into said pole body from the pole body attaching face and being aligned with said tip slots; said coil windings being received jointly within said tip slots and said body slots.

15. A dynamoelectric machine according to claim 13 wherein said pole face is curved in an arc concentric with said axis.

16. A dynamoelectric machine according to claim 15 wherein said pole face is continuous throughout said arc.

17. A dynamoelectric machine according to claim 16 wherein said coil windings are compensation windings, said stator member also having excitation windings superimposed on said pole body.

* * * * *